(12) United States Patent
Tiefenbach

(10) Patent No.: US 9,231,404 B2
(45) Date of Patent: Jan. 5, 2016

(54) ENERGY STORAGE DEVICE, SYSTEM WITH ENERGY STORAGE DEVICE AND METHOD FOR DRIVING AN ENERGY STORAGE DEVICE

(71) Applicant: Robert Bosch GmbH, Stuttgart (DE)

(72) Inventor: Andy Tiefenbach, Vaihingen-Horrheim (DE)

(73) Assignee: Robert Bosch GmbH, Stuttgart (DE)

( * ) Notice: Subject to any disclaimer, the term of this patent is extended or adjusted under 35 U.S.C. 154(b) by 594 days.

(21) Appl. No.: 13/710,590

(22) Filed: Dec. 11, 2012

(65) Prior Publication Data

US 2013/0154379 A1 Jun. 20, 2013

(30) Foreign Application Priority Data

Dec. 20, 2011 (DE) .......................... 10 2011 089 297

(51) Int. Cl.
*H02J 1/00* (2006.01)
*B60L 11/18* (2006.01)

(52) U.S. Cl.
CPC ............... *H02J 1/00* (2013.01); *B60L 11/1853* (2013.01); *B60L 11/1864* (2013.01); *Y02T 10/7005* (2013.01); *Y02T 10/7061* (2013.01); *Y10T 307/685* (2015.04)

(58) Field of Classification Search
CPC .... B60L 11/1853; B60L 11/1864; H02J 1/00; Y10T 307/685; Y02T 10/7005; Y02T 10/7061
USPC ........................................................... 307/77
See application file for complete search history.

(56) References Cited

U.S. PATENT DOCUMENTS

| 5,642,275 A | 6/1997 | Peng et al. |
| 2011/0254373 A1* | 10/2011 | Johnson .......................... 307/77 |
| 2013/0200693 A1* | 8/2013 | Butzmann et al. ........... 307/10.1 |

FOREIGN PATENT DOCUMENTS

| DE | 102010027857 | 10/2011 |
| DE | 102010027861 | 10/2011 |

* cited by examiner

*Primary Examiner* — Thienvu Tran
*Assistant Examiner* — Kevin J Comber
(74) *Attorney, Agent, or Firm* — Michael Best & Friedrich LLP

(57) ABSTRACT

An energy storage device. An energy supply branch, with a plurality of energy storage modules is connected in series via first module connections along a first energy supply line and via second module connections along a second energy supply line. The energy storage modules include an energy storage cell module having an energy storage cell, a first coupling device having first coupling elements, configured to switch or bypass the energy storage cell module selectively between the first module connections, and a second coupling device having second coupling elements, which are designed to switch or bypass the energy storage cell module selectively between the second module connections. The energy storage device also includes an output connection coupled to an output of the first energy supply line; and two additional connections coupled to the outputs of the second energy supply line.

12 Claims, 3 Drawing Sheets

ENERGY STORAGE DEVICE, SYSTEM WITH ENERGY STORAGE DEVICE AND METHOD FOR DRIVING AN ENERGY STORAGE DEVICE

BACKGROUND OF THE INVENTION

The invention relates to an energy storage device, a system having an energy storage device and a method for driving an energy storage device, in particular in a battery direct converter circuit for simultaneous power supply to an electric machine and generation of a further voltage level for a DC voltage system.

The trend is that in the future electronic systems which combine new energy storage technologies with electrical drive technology will be used increasingly both in stationary applications, such as wind power installations or solar installations, and in vehicles, such as hybrid or electric vehicles.

The feed of polyphase current to an electric machine is generally provided by a converter in the form of a pulse-controlled inverter. For this purpose, a DC voltage provided by a DC voltage intermediate circuit can be converted into a polyphase AC voltage, for example a three-phase AC voltage. The DC voltage intermediate circuit is in this case fed by a line of battery modules connected in series. In order to be able to meet the requirements for power and energy provided for a respective application, often a plurality of battery modules are connected in series in a traction battery.

The series circuit comprising a plurality of battery modules is associated with the problem that the entire line fails when a single battery module fails. Such a failure of the energy supply line can result in failure of the entire system. Furthermore, temporarily or permanently occurring power reductions of an individual battery module can result in power reductions in the entire energy supply line.

Document U.S. Pat. No. 5,642,275 A1 describes a battery system with an integrated inverter function. Systems of this type are known under the name multilevel cascaded inverter or else battery direct inverter (BDI). Such systems comprise DC sources in a plurality of energy storage module lines, which can be connected directly to an electric machine or an electrical power supply system. In this case, single-phase or polyphase supply voltages can be generated. The energy storage module lines in this case have a plurality of energy storage modules which are connected in series, wherein each energy storage module has at least one battery cell and an associated controllable coupling unit, which makes it possible to interrupt the respective energy storage module line or to bypass the respectively associated at least one battery cell or to switch the respectively associated at least one battery cell into the respective energy storage module line, depending on control signals. By suitable driving of the coupling units, for example with the aid of pulse width modulation, suitable phase signals for controlling the phase output voltage can also be provided, with the result that there is no need for a separate pulse-controlled inverter. The pulse-controlled inverter required for controlling the phase output voltage is therefore integrated in the BDI, so to speak.

BDIs generally have a higher degree of efficiency and higher degree of failsafety in comparison with conventional systems. The failsafety is ensured, inter alia, by virtue of the fact that defective, failed or not fully effective battery cells can be disconnected from the energy supply lines by suitable bypass driving of the coupling units. The phase output voltage of an energy storage module line can be varied, and in particular set stepwise, by correspondingly driving the coupling units. The stepping of the output voltage in this case results from the voltage of an individual energy storage module, with the maximum possible phase output voltage being determined the sum of the voltages of all energy storage modules of an energy storage module line.

Documents DE 10 2010 027 857 A1 and DE 10 2010 027 861 A1, for example, disclose battery direct inverters with a plurality of battery module lines, which can be connected directly to an electric machine.

There is no constant DC voltage available at the output of BDIs since the energy storage cells are divided between different energy storage modules and the coupling directions thereof need to be driven in a targeted manner for generating a voltage level.

There is therefore a need for an energy storage device and a method for operating said energy storage device, with which two different voltage levels, including in particular a DC voltage level, can be provided simultaneously.

SUMMARY OF THE INVENTION

In accordance with one aspect, the present invention provides an energy storage device for producing two supply voltage levels, having at least one energy supply branch, which has a large number of energy storage modules, which are each connected in series via first module connections along a first energy supply line and via second module connections along a second energy supply line. In this case, the energy storage modules each comprise an energy storage cell module, which has at least one energy storage cell, a first coupling device having first coupling elements, which are designed to switch or bypass the energy storage cell module selectively between the first module connections, and a second coupling device having second coupling elements, which are designed to switch or bypass the energy storage cell module selectively between the second module connections. The energy storage device further comprises at least one output connection which is coupled to an output of the first energy supply line and at which a first voltage level of the energy storage device can be tapped off, and two additional connections, which are coupled to the outputs of the second energy supply line and via which a second voltage level of the energy storage device can be tapped off.

In accordance with a further aspect, the present invention provides a system, having an energy storage device according to the invention, an on-board electrical system intermediate circuit capacitor, which is coupled to the additional connections of the energy storage device, an n-phase electric machine with n phase connections, which are coupled to output connections of the energy storage device, where n≥1, and a control device, which is coupled to the energy storage device and which is designed to drive the coupling devices of the at least one energy supply branch in such a way that the associated energy storage cell modules are either coupled into one of the energy supply lines or bypassed.

In accordance with a further aspect, the present invention provides a method for driving an energy storage device according to the invention, having the steps of driving the first coupling elements of a first energy storage module of the energy supply branch for switching the energy storage cell module of the first energy storage module into the first energy supply line given simultaneous driving of the second coupling elements of the first energy storage module for bypassing the energy storage cell module in the second energy supply line, and driving the second coupling elements of a second energy storage module of the energy supply branch for switching the energy storage cell module of the second energy storage module into the second energy supply line given simultaneous driving of the first coupling elements of the second energy storage module for bypassing the energy storage cell module in the first energy supply line.

The concept of the present invention consists in modifying an energy storage device such that two different voltage levels can be tapped off at least one energy supply branch simultaneously. For this purpose, provision is made for energy storage modules to be configured with a central energy storage cell module and two separate coupling devices, with the result that two supply lines can be realized within an energy supply branch, with it being possible for the central energy storage cell modules of the energy storage modules to be coupled into said supply lines selectively, i.e. by corresponding driving of one of the two separate coupling devices. Then, two different supply voltages or voltage levels can be provided at the outputs of the two supply lines.

A considerable advantage associated with this arrangement consists in that the energy storage device can be used in a system for which an additional voltage level is required, without any additional implementation measures. For example, when using the energy storage device in an electrically operated vehicle, a supply voltage for the electric drive and a high-voltage DC voltage for the high-voltage on-board electrical system of the electrically operated vehicle can be generated simultaneously.

Advantageously, owing to the parallel use of energy storage modules for the provision of one of two voltage levels, the degree of utilization of the existing energy storage cell modules can be increased, as a result of which the number of components required and therefore the amount of installation space required and the weight of the system are reduced.

The additional complexity involved in terms of circuitry is advantageously low. Furthermore, there is the advantage that, in the generation of the additional voltage level, balancing of the energy storage cell modules involved can take place during operation of the system, with the result that the energy storage cell modules are subjected to a uniform load and, as a result, the life and availability of the energy storage device is increased.

In accordance with one embodiment of the energy storage device according to the invention, the first and/or second coupling devices can comprise first coupling elements, for example MOSFET switches or IGBT switches, for directly connecting the first and/or second module connections. In accordance with an advantageous embodiment, provision can be made in this case for the first and/or second coupling devices to each comprise two second coupling elements, for example MOSFET switches or IGBT switches, which are coupled to the outputs of the respective energy storage cell modules.

In accordance with a further embodiment, the energy storage device according to the invention can furthermore have a first line coupling element, which is coupled at a first output of the energy supply branch between the first energy supply line and the second energy supply line, and a second line coupling element, which is coupled at a second output of the energy supply branch between the first energy supply line and the second energy supply line. As a result, the second voltage level, given a suitable first voltage level, can also be provided via the first energy supply line. This is particularly advantageous when many of the energy storage modules contribute to the first voltage level in the first energy supply line and at this time already insufficient energy storage modules remain for providing the second voltage level in the second energy supply line.

In accordance with a further embodiment, the energy storage device according to the invention can furthermore comprise at least one further energy supply branch, which is coupled to one of the output connections of the energy storage device and which has a large number of further energy storage modules connected in series. In this case, the further energy storage modules can each have an energy storage cell module, which has at least one energy storage cell, and a coupling device having coupling elements which are designed to switch or bypass the energy storage cell module selectively in the respective energy supply branch.

In accordance with one embodiment of the system according to the invention, the energy storage device can have n output connections, which are each coupled to one of the n phase connections via one of n phase conductors.

In accordance with another embodiment of the system according to the invention, the energy storage device can have two output connections, which are coupled to input connections of a pulse-controlled inverter, which is coupled to the n phase connections of the n-phase electric machine.

In accordance with one embodiment of the method according to the invention, the method can furthermore have the step of closing the first and second line coupling elements for coupling the two additional connections to the first energy supply line when the voltage applied via the first energy supply line exceeds a predetermined threshold value.

Further features and advantages of embodiments of the invention are given in the description below with reference to the attached drawings.

DETAILED DESCRIPTION

Figure 1:
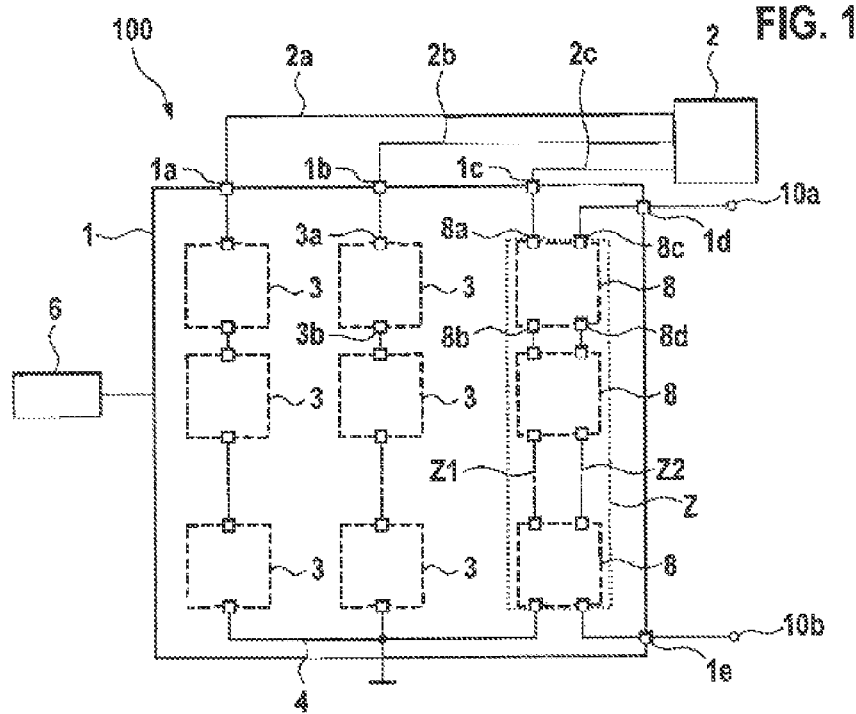
FIG. 1 shows a schematic illustration of a system having an energy storage device in accordance with one embodiment of the present invention.

FIG. 1 shows a schematic illustration of a system 100 having an energy storage device 1 for voltage conversion of DC voltage provided by energy storage modules 3 and 8 into an n-phase AC voltage, on the one hand, and a DC voltage, on the other hand. The energy storage device 1 comprises a large number of energy supply branches, of which three are shown by way of example in FIG. 1, which are suitable for generating a three-phase AC voltage, for example for a three-phase machine 2. However, it is clear that any other number of energy supply branches can likewise be possible. Some of the energy supply branches can have a large number of energy storage modules 3, which are connected in series in energy supply branches. By way of example, in each case three energy storage modules 3 per energy supply branch are shown in FIG. 1, but any other number of energy storage modules 3 can likewise be possible. At each of the energy supply branches, the energy storage device 1 has an output connection 1a, 1b, which are each connected to phase conductors 2a and 2b, respectively.

The system 100 can furthermore comprise a control device 6, which is connected to the energy storage device 1, and with the aid of which the energy storage device 1 can be controlled in order to provide the desired output voltages at the respective output connections 1a, 1b, 1c.

The energy storage modules 3 each have two output connections 3a and 3b, via which an output voltage of the energy storage modules 3 can be provided. Since the energy storage modules 3 are primarily connected in series, the output voltages of the energy storage modules 3 are added to give a total output voltage, which can be provided at the respective one of the output connections 1a, 1b of the energy storage device 1.

Figure 2:
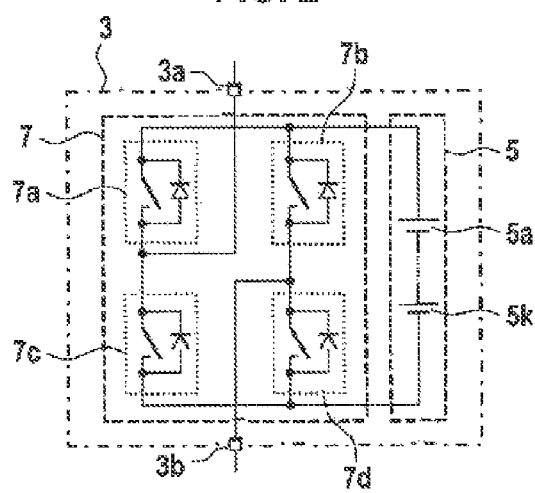
FIG. 2 shows a schematic illustration of an energy storage module of an energy storage device.
Figure 3:
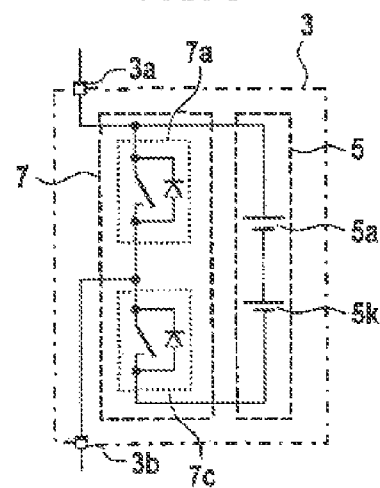
FIG. 3 shows a schematic illustration of an energy storage module of an energy storage device.

Exemplary design embodiments of the energy storage modules 3 are shown in greater detail in FIGS. 2 and 3. The energy storage modules 3 in this case each comprise a coupling device 7 with a plurality of coupling elements 7a, 7c and possibly 7b and 7d. Furthermore, the energy storage modules 3 each comprise an energy storage cell module 5 with one or more energy storage cells 5a to 5k connected in series.

The energy storage cell module 5 can in this case have, for example, batteries 5a to 5k connected in series, for example lithium-ion batteries. In this case the number of energy storage cells 5a to 5k in the energy storage modules 3 shown in FIGS. 2 and 3 is two, for example, but any other number of energy storage cells 5a to 5k is likewise possible.

The energy storage cell modules 5 are connected to the input connections of the respective coupling device 7 via connecting conductors. The coupling device 7 in FIG. 2 is, by way of example, in the form of a full-bridge circuit with in each case two coupling elements 7a, 7c and two coupling elements 7b, 7d. The coupling elements 7a, 7b, 7c, 7d can in this case each have an active switching element, for example a semiconductor switch, and a freewheeling diode connected in parallel therewith. In this case, provision can be made for the coupling elements 7a, 7b, 7c, 7d to be in the form of MOSFET switches, which already have an intrinsic diode, or IGBT switches. Alternatively, it is possible to design in each case only two coupling elements 7a, 7c such that a half-bridge circuit is realized, as illustrated by way of example in FIG. 3.

The coupling elements 7a, 7b, 7c, 7d can be driven in such a way, for example with the aid of the control device 6 illustrated in FIG. 1, that the respective energy storage cell module 5 is switched selectively between the output connections 3a and 3b or that the energy storage cell module 5 is bypassed. With reference to FIG. 2, the energy storage cell module 5 can be connected, for example in the forward direction, between the output connections 3a and 3b by virtue of the active switching element of the coupling element 7d and the active switching element of the coupling element 7a being set to a closed state, while the two remaining active switching elements of the coupling elements 7b and 7c are set to an open state. A bypass state can be set, for example, by virtue of the fact that the two active switching elements of the coupling elements 7a and 7b are set to the closed state, while the two active switching elements of the coupling elements 7c and 7d are held in the open state. Similar considerations can be used respectively for the half-bridge circuit in FIG. 3. By suitably driving the coupling devices 7, individual energy storage cell modules 5 of the energy storage modules 3 can therefore be integrated in a targeted manner in the series circuit of an energy supply branch.

Making reference once again to FIG. 1, some of the energy supply branches of the energy storage device 1 can have a large number of energy storage modules 8, which are connected in series in these energy supply branches. By way of example, FIG. 1 shows an energy supply branch Z with three energy storage modules 8, but any other number of energy storage modules 8 can likewise be possible. The energy supply branch Z has two energy supply lines Z1 and Z2, wherein the first energy supply line Z1 is connected to a further phase conductor 2c via an output connection 1c, and wherein the second energy supply line Z2 is connected at the outputs of the energy supply branch Z to two additional connections 1d and 1e of the energy storage device 1.

In comparison with the remaining energy supply branches, the energy supply branch Z is characterized by the fact that its energy storage modules 8 have four module connections 8a and 8b and 8c and 8d, via which each of the energy storage modules 8 can be connected selectively either into the first energy supply line Z1 or the second energy supply line Z2. As a result, the individual energy storage modules 8 can contribute either to the output voltage of the first energy supply line Z1 or the second energy supply line Z2.

By way of example, the system 100 in FIG. 1 is used for feeding a three-phase electric machine 2. However, provision can also be made for the energy storage device 1 to be used for generating electrical current for an energy supply system 2. The energy supply branches can be connected at their end to a reference potential 4 (reference rail), which, in the embodiment illustrated, carries a mid potential with respect to the phase conductors 2a, 2b, 2c of the electric machine 2. The reference potential 4 can be a ground potential, for example. In this case, the energy supply branch Z is coupled to the reference potential only via the first energy supply line Z1. In this case, each of the energy supply branches preferably comprises the same number of energy storage modules 3 and 8, but it is also possible for a different number of energy storage modules 3 or 8 to be provided for each energy supply branch.

Figure 4:
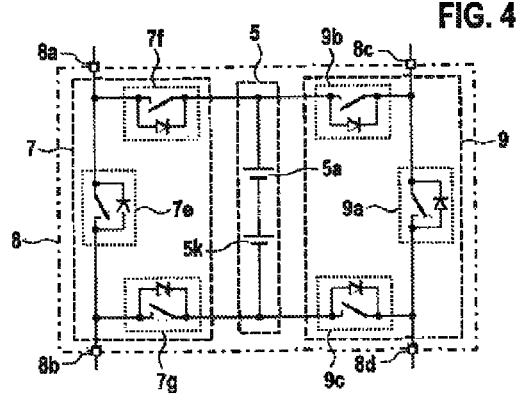
FIG. 4 shows a schematic illustration of an energy storage module of an energy storage device in accordance with a further embodiment of the invention.

An exemplary embodiment of an energy storage module 8 which is provided in the energy supply branch Z is depicted in a schematic illustration in FIG. 4. The energy storage modules 8 in this case each comprise a first coupling device 7 having a plurality of coupling elements 7e, 7f and 7g and a second coupling device 9 having a plurality of coupling elements 9a, 9b and 9c. The energy storage modules 8 furthermore each comprise an energy storage cell module 5 having one or more energy storage cells 5a to 5k connected in series. The energy storage cell module 5 can in this case correspond to the energy storage cell module 5 shown in FIGS. 2 and 3, for example.

The energy storage cell modules 5 are connected to input connections of the associated coupling devices 7 and 9 via connecting conductors, with the result that the first coupling device 7 can switch or bypass the energy storage cell module 5 selectively between the first module connections 8a and 8b, and the second coupling device 9 can switch or bypass the energy storage cell module 5 selectively between the second module connections 8c and 8d. In other words, the energy storage cell module 5 can be connected either into the first energy supply line Z1 or the second energy supply line Z2 via corresponding driving of the respective coupling elements 7e, 7f and 7g or 9a, 9b and 9c.

The coupling elements 7e, 7f and 7g or 9a, 9b and 9c can, in the same way as the coupling elements in FIGS. 2 and 3, each have an active switching element, for example a semiconductor switch, and a freewheeling diode connected in parallel therewith and can be in the form of MOSFET switches, which already have an intrinsic diode, or IGBT switches. In addition, the coupling elements 7e, 7f and 7g or 9a, 9b and 9c can likewise be driven with the aid of the control device 6 illustrated in FIG. 1, with the result that the respective energy storage cell module 5 is switched selectively between two of the module connections 8a and 8b or 8c and 8d, or the energy storage cell module 5 is bypassed.

In order to generate a phase voltage between the output connection 1c and the reference rail 4 in the energy supply branch Z, only some of the energy storage cell modules 5 of the energy storage modules 8 are generally required. As a result, some of the energy storage modules 8 remain unused at least temporarily in terms of the generation of the total output voltage of the first energy supply line Z1. These energy storage modules 8 can instead be used to generate a further voltage level, which is present over the second energy supply line Z2 and can be tapped off at the two additional connections 1d and 1e. For example, an on-board electrical system of an electric vehicle with on-board electrical system connections 10a and 10b can be connected to the two additional connections 1d and 1e, in particular a high-voltage DC voltage on-board electrical system. It is therefore possible with the aid of the energy supply branch Z to generate a voltage level for feeding an electric machine 2 with an n-phase alternating current and a further voltage level, for example for feeding a DC voltage power supply system, simultaneously. Preferably, for this purpose, the sum of all module voltages of the energy storage modules 8 of the energy supply branch Z is set higher than the voltage required for generating a phase voltage. As a result, some of the energy storage modules 8 of the energy supply branch Z are "superfluous" at any point in time during the operation of the energy storage device 1, and these can be used for generating the further voltage level.

In this case, care should be taken to ensure that each of the energy storage cell modules 5 of the energy storage modules 8 can only be used for one energy supply line Z1 or Z2 in each case. The control device 6 can in this case assign dynamically the energy storage modules 8 corresponding to their association, to one of the energy supply lines Z1 and Z2, for example taking into consideration corresponding cell balancing.

Figure 5:
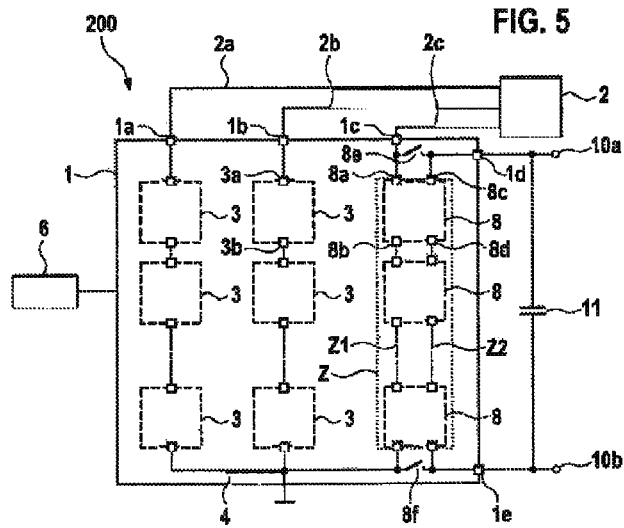
FIG. 5 shows a schematic illustration of a system having an energy storage device in accordance with a further embodiment of the present invention.

FIG. 5 shows a schematic illustration of a system 200 with an energy storage device 1. The system 200 differs from the system 100 substantially in that an on-board electrical system intermediate circuit capacitor 11, which buffers the on-board electrical system with respect to surge voltages caused by high-frequency switching operations, is provided between the additional connections 1d and 1e. In addition, a first line coupling element 8e, which is coupled at a first output of the energy supply branch Z between the first energy supply line Z1 and the second energy supply line Z2, and a second line coupling element 8f, which is coupled at a second output of the energy supply branch Z between the first energy supply line Z1 and the second energy supply line Z2, are provided in the system 200. The line coupling elements 8e, 8f can serve the purpose of providing the voltage level present over the first energy supply line Z1 instead of the voltage level present over the second energy supply line Z2 at the two additional connections 1d, 1e. This can be advantageous in particular when the instantaneous voltage over the first energy supply line Z1 is high, i.e. when a large number of the energy storage modules 8 are connected into the first energy supply line Z1. For example, the two additional connections 1d, 1e can be coupled to the first energy supply line Z1 via the line coupling elements 8e, 8f whenever the voltage present over the first energy supply line Z1 exceeds a predetermined threshold value. In such a state, the remaining number of energy storage modules 8 can under certain circumstances no longer be sufficient for generating the required voltage in the second energy supply line Z1. In this case, the voltage present in the first energy supply line Z1 can be coupled to the two additional connections 1d, 1e by selectively closing the line coupling elements 8e, 8f. In this implementation, the maximum branch voltage can be as high as the maximum required phase voltage of the energy supply branch Z. The line coupling elements 8e, 8f can have semiconductor switches, for example.

Figure 6:
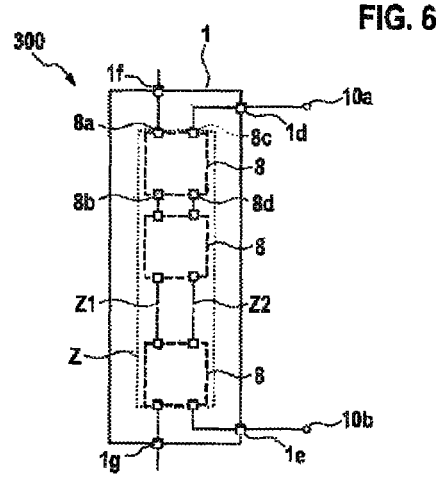
FIG. 6 shows a schematic illustration of an energy storage device in accordance with a further embodiment of the present invention.

FIG. 6 shows a schematic illustration of a system 300 having an energy storage device 1, which has only the energy supply branch Z. The first energy supply line Z1 is in this case coupled to output connections 1f and 1g, while the second energy supply line Z2 is coupled to the additional connections 1d, 1e. This system 300 realizes a single-phase energy storage device 1, wherein a first single-phase voltage level can be provided at the output connections 1f and 1g and, simultaneously, a further voltage level can be provided at the additional connections 1d, 1e. The single-phase energy storage device 1 can be used as a so-called battery direct converter (BDC), for example, which feeds an intermediate circuit. By suitable driving of the single-phase energy storage device 1, a voltage can be set at the intermediate circuit capacitor via the output connections 1f and 1g, which voltage can be used to supply a pulse-controlled inverter, which ultimately feeds an electric machine, for example a three-phase electric machine. This is particularly advantageous when, in the event of low rotation speeds of the electric machine, a low intermediate circuit voltage is advantageous, but the high-voltage on-board electrical system can nevertheless be supplied with a sufficiently high voltage via the additional connections 1d, 1e.

Figure 7:
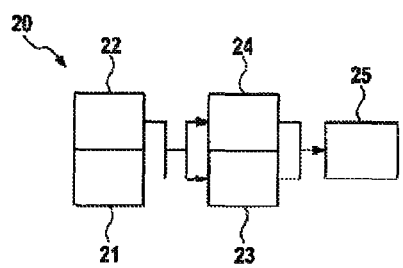
FIG. 7 shows a schematic illustration of a method for driving an energy storage device in accordance with a further embodiment of the present invention.

FIG. 7 shows a schematic illustration of a method 20 for driving an energy storage device, in particular the energy storage device 1 in one of FIGS. 1, 4 and 5. In a first step 21, driving of the first coupling elements 7e, 7f, 7g of a first energy storage module of the energy supply branch Z for switching the energy storage cell module of the first energy storage module into the first energy supply line Z1 takes place. Simultaneously with this, in a second step 22, driving of the second coupling elements 9a, 9b, 9c of the first energy storage module for bypassing the energy storage cell module in the second energy supply line Z2 takes place. In a third step 23, driving of the second coupling elements 9a, 9b, 9c of a second energy storage module of the energy supply branch Z for switching the energy storage cell module of the second energy storage module into the second energy supply line Z2 then takes place. Simultaneously with this, in a fourth step 24, driving of the first coupling elements 7e, 7f, 7g of the second energy storage module for bypassing the energy storage cell module in the first energy supply line Z1 takes place.

Optionally, in a subsequent step 25, closing of the first and second line coupling elements 8e, 8f for coupling the two additional connections 1d, 1e to the first energy supply line Z1 when the voltage present over the first energy supply line Z1 exceeds a predetermined threshold value can take place in an energy storage device of a system 300.

The invention claimed is:
1. An energy storage device (1) for producing two supply voltage levels, comprising: an energy supply branch (Z), which has:
  a plurality of energy storage modules (8) connected in series via first module connections (8a, 8b) along a first energy supply line (Z1) and via second module connections (8c, 8d) along a second energy supply line (Z2) and which each comprise:
    an energy storage cell module (5) having an energy storage cell (5a, 5k),
    a first coupling device (7) having first coupling elements (7e, 7f, 7g) configured to switch or bypass the energy storage cell module (5) selectively between the first module connections (8a, 8b), and a second coupling device (9) having second coupling elements (9a, 9b, 9c) configured to switch or bypass the energy storage cell module (5) selectively between the second module connections (8a, 8b);

an output connection (1c; 1f) coupled to an output of the first energy supply line (Z1) and at which a first voltage level of the energy storage device (1) is provided; and two additional connections (1d, 1e), which are coupled to the outputs of the second energy supply line (Z2) and via which a second voltage level of the energy storage device (1) is provided.

2. The energy storage device (1) according to claim 1, wherein the first coupling device (7) comprises a first coupling elements (7e) for directly connecting the first module connections (8a, 8b).

3. The energy storage device (1) according to claim 2, wherein the first coupling device (7) comprises two second coupling elements (7f, 7g) coupled to the outputs of the respective energy storage cell modules (5).

4. The energy storage device (1) according to claim 1, wherein the second coupling device (9) comprises a first coupling element (9a) for directly connecting the second module connection (8c, 8d).

5. The energy storage device (1) according to claim 4, wherein the second coupling device (9) comprises two second coupling elements (9b, 9c) coupled to the outputs of the respective energy storage cell modules (5).

6. The energy storage device (1) according to claim 1, further comprising:

a first line coupling element (8e), which is coupled at a first output of the energy supply branch (Z) between the first energy supply line (Z1) and the second energy supply line (Z2); and a second line coupling element (8f) coupled at a second output of the energy supply branch (Z) between the first energy supply line (Z1) and the second energy supply line (Z2).

7. The energy storage device (1) according to claim 1, further comprising:

at least one further energy supply branch coupled to an output connection (1a, 1b) of the energy storage device (1), and a plurality of further energy storage modules (3) connected in series and which each comprise:

an energy storage cell module (5) having an energy storage cell (5a, 5k), and a coupling device (7) with coupling elements (7a, 7b, 7c, 7d) configured to switch or bypass the energy storage cell module (5) selectively in the respective energy supply branch.

8. A system (100; 200; 300), having:

an energy storage device (1) according to claim 1;

an on-board electrical system intermediate circuit capacitor (11), which is coupled to the additional connections (1d, 1e) of the energy storage device (1);

an n-phase electric machine (2) with n phase connections, which are coupled to output connections (1a, 1b, 1c; 1f, 1g) of the energy storage device (1), where n≥1; and a control device (6), which is coupled to the energy storage device (1) and configured to drive the coupling devices (7; 9) of the at least one energy supply branch (Z) in such a way that the associated energy storage cell modules (5) are either coupled into one of the energy supply lines (Z1; Z2) or bypassed.

9. The system (100; 200) according to claim 8, wherein the energy storage device (1) has n output connections (1a, 1b, 1c), which are each coupled to one of the n phase connections via one of n phase conductors (2a, 2b, 2c).

10. The system (300) according to claim 8, wherein the energy storage device (1) has two output connections (1f, 1g) coupled to input connections of a pulse-controlled inverter coupled to the n phase connections of the n-phase electric machine (2).

11. A method (20) for driving an energy storage device (1) according to claim 1, comprising:

driving (21) the first coupling elements (7e, 7f, 7g) of a first energy storage module (8) of the energy supply branch (Z) for switching the energy storage cell module (5) of the first energy storage module (8) into the first energy supply line (Z1) given simultaneous driving (22) of the second coupling elements (9a, 9b, 9c) of the first energy storage module (8) for bypassing the energy storage cell module (5) in the second energy supply line (Z2); and driving (23) the second coupling elements (9a, 9b, 9c) of a second energy storage module (8) of the energy supply branch (Z) for switching the energy storage cell module (5) of the second energy storage module (8) into the second energy supply line (Z2) given simultaneous driving (24) of the first coupling elements (7e, 7f, 7g) of the second energy storage module (8) for bypassing the energy storage cell module (5) in the first energy supply line (Z1).

12. The method (20) according to claim 11, wherein the method (20) for driving an energy storage device (1) including an energy supply branch (Z) having a plurality of energy storage modules (8) connected in series via first module connections (8a, 8b) along a first energy supply line (Z1) and via second module connections (8c, 8d) along a second energy supply line (Z2) and which each include an energy storage cell module (5) having an energy storage cell (5a, 5k), a first coupling device (7) having first coupling elements (7e, 7f, 7g) configured to switch or bypass the energy storage cell module (5) selectively between the first module connections (8a, 8b), and a second coupling device (9) having second coupling elements (9a, 9b, 9c) configured to switch or bypass the energy storage cell module (5) selectively between the second module connections (8a, 8b), an output connection (1c; 1f) coupled to an output of the first energy supply line (Z1) and at which a first voltage level of the energy storage device (1) is provided, two additional connections (1d, 1e), which are coupled to the outputs of the second energy supply line (Z2) and via which a second voltage level of the energy storage device (1) is provided, a first line coupling element (8e), which is coupled at a first output of the energy supply branch (Z) between the first energy supply line (Z1) and the second energy supply line (Z2), and a second line coupling element (8f) coupled at a second output of the energy supply branch (Z) between the first energy supply line (Z1) and the second energy supply line (Z2), the method comprising:

closing (25) the first and second line coupling elements (8e, 8f) for coupling the two additional connections (1d, 1e) to the first energy supply line (Z1) when the voltage applied via the first energy supply line (Z1) exceeds a predetermined threshold value.

* * * * *